United States Patent [19]

Karinthi et al.

[11] Patent Number: 5,587,283
[45] Date of Patent: Dec. 24, 1996

[54] COMBUSTION PROCESS

[75] Inventors: Pierre Karinthi, Jouy en Josas; Marc Buffenoir, Voisins le Bretonneux, both of France; Dominique Belot, Tokyo, Japan

[73] Assignee: L'Air Liquide, Societe Anonyme pour l'Etude et L'Exploitation des Procedes Georges Claude, Paris Cedex, France

[21] Appl. No.: 303,505

[22] Filed: Sep. 9, 1994

[30] Foreign Application Priority Data

Sep. 9, 1993 [FR] France .................................. 93 10703

[51] Int. Cl.⁶ .................................................... F23C 7/00
[52] U.S. Cl. .................. 431/10; 431/2; 431/187; 431/8
[58] Field of Search .............. 431/2, 8, 10, 181, 431/187

[56] References Cited

U.S. PATENT DOCUMENTS 3,841,565  10/1974  Buisson et al. ..................... 239/488

FOREIGN PATENT DOCUMENTS

| 0340423 | 11/1989 | European Pat. Off. . |
| 0521522 | 1/1993 | European Pat. Off. . |
| 0529667 | 3/1993 | European Pat. Off. . |
| 2462657 | 2/1981 | France . |
| 70049 | 12/1969 | Germany . |
| 405060309 | 3/1993 | Japan ........................................ 431/2 |

Primary Examiner—Carl D. Price
Attorney, Agent, or Firm—Young & Thompson

[57] ABSTRACT

In a combustion process permitting reducing the production $NO_x$, there is ejected via a burner (1) at least one flow of combustible gas, at least one flow of an oxygenated gas supporting combustion and at least one flow (10) of one of these gases in liquid phase. In an oxyburner, one portion (between 13 and 35%) of the oxygen is injected in liquid phase. In an aeroburner for natural gas, one portion (10 to 30%) of this latter is ejected in a coherent liquid jet. Use particularly in glass furnaces and heaters.

8 Claims, 1 Drawing Sheet

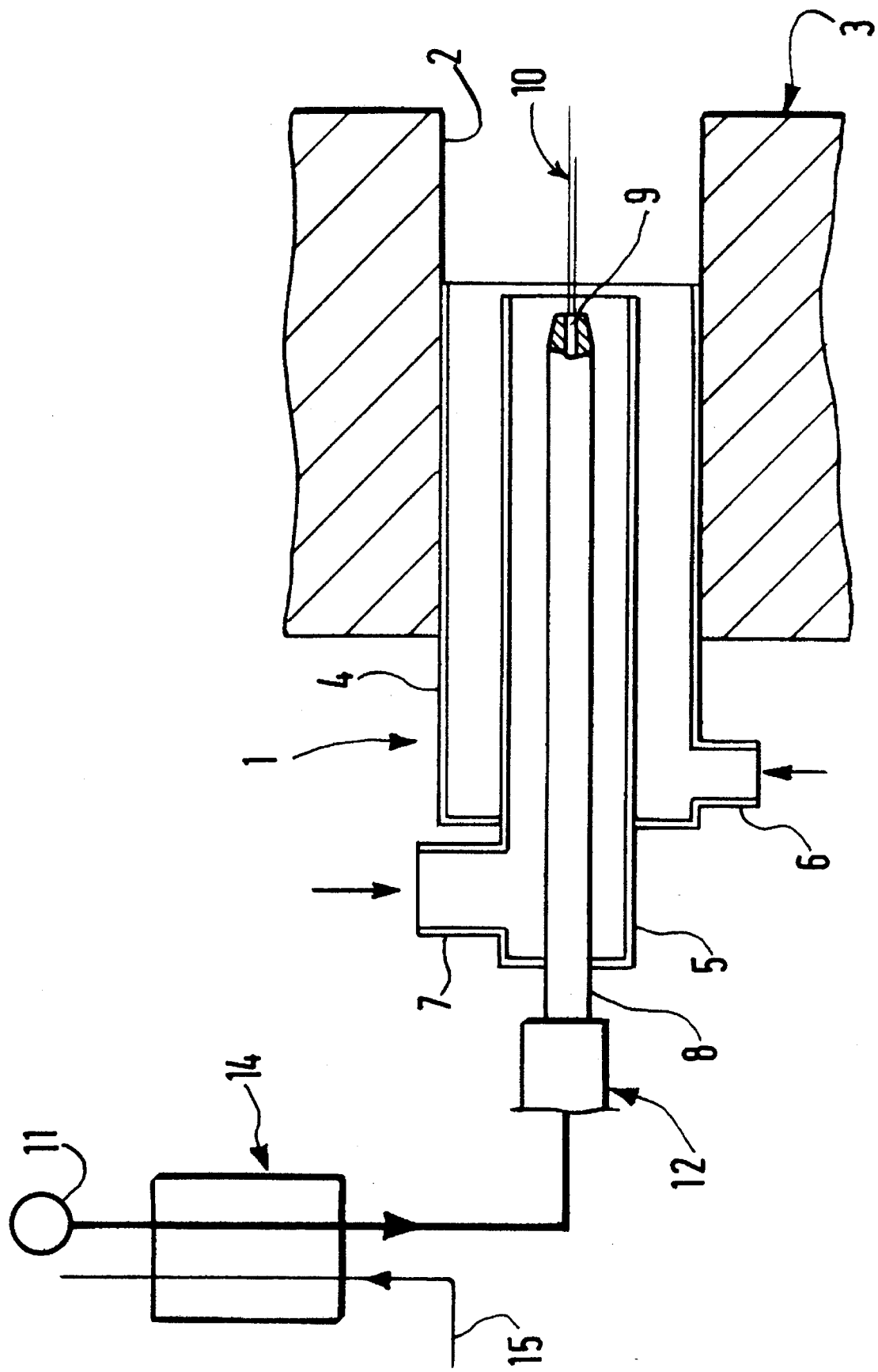

COMBUSTION PROCESS

BACKGROUND OF THE INVENTION

The present invention relates to combustion processes of the type comprising the steps of injecting, via a burner at least one flow of combustible gas and at least one flow of oxygenated combustion supporting gas.

Most of the combustion processes are confronted with problems of the undesired production of $NO_x$, the nitrogen from the air in the combustion processes involving air, or a parasitic entry of air or of combustibles and combustion supporting gases themselves in the case of oxygen combustion. Numerous techniques have been proposed to reduce the production of $NO_x$, particularly to decrease the maximum temperature of the flame or to elongate the flame. There can thus be cited the techniques of recycling the burner fumes, staging the combustion or the pulsation of the combustion fluids. These different techniques have certain particular applications but are not satisfactory for most users, particularly for low power installations.

SUMMARY OF THE INVENTION

The present invention has for its object to provide a combustion process permitting in a flexible and easily adjustable manner, over a wide range of combustion gases, obtaining an elongation of the flame and therefore a reduction of the maximum temperature thereby to reduce significantly the quantity of $NO_x$ formed.

To do this, according to one characteristic of the invention, the process comprises of the step of injecting at least the portion of one of said gas flows in liquid phase, particularly as a liquid jet.

According to other characteristics of the invention:

In a combustion process in which the combustion supporting gas is air, the gas injected in liquid and gaseous phases is gas containing methane, typically natural gas;

in the oxygen combustion processes, the gas injected in liquid phase is the oxygen.

The reference DD-A-70.049 (Boschnakow), of 1968, describes a process for oxycutting of metallic work pieces in which, to obtain a reduced widths of cut and increased depth of cut, there is injected a flow of liquid oxygen under pressure.

BRIEF DESCRIPTION OF THE DRAWING

Other characteristics and advantages of the present invention will become apparent from the following description of embodiments given by way of example but in no way limiting, with respect to the accompanying drawing in which:

The single FIGURE shows schematically burner equipment for practicing the process according to the invention.

In the FIGURE, there is shown a burner structure, generally designated by reference numeral 1, disposed in an opening 2 passing through a wall 3 of a furnace or within a thermal enclosure. In the illustrated embodiment, the burner comprises an external tube 4 and an internal concentric tube 5 each provided with at least one conduit 6, 7, respectively for the supply of a combustion gas injected from the opening 2 into the thermal enclosure 3. In the central tube 5 extends for example centrally coaxially at least one injection tube 8 terminating in an injection head with a calibrated orifice 9 to inject toward the enclosure 3 at least one coherent jet at high velocity of liquified gas 10 from a source 11 of said gas in gaseous or liquid phase, the tube 8 being supplied by a thermally insulated conduit 12, under vacuum and/or with the circulation of a cooling cryogenic fluid.

The applicant has shown that, with such a type of burner, the coherent jet of liquified gas 10 can pass through a great length of the high temperature region, particularly the flame region generated by the ejection of gas through the tubes 4 and 5. The combustion gas thus propelled in liquid phase can therefore react with the injected gas at a greater distance from the outlet of the burner than this latter. There is also obtained an adjustable elongation of the flame which is easily adaptable, as a function of the proportion of liquified gas injected, and of its injection pressure and of the configuration of the injector, to the geometry of the enclosure to be heated and to the configuration of the flame which is desired.

In a first embodiment, there will be cited a rotatable furnace for melting and casting steel provided at its inlet with a burner supplied with natural gas and pure oxygen. Such a furnace with a load of 8 tons of cast iron is heated by a burner which discharges 250 m³/h of natural gas and 500 m³/h of pure oxygen. The axial length of the furnace is about 4.7 meters. Under normal operating conditions, the length of the flame is 1.5 m, its maximum temperature is about 2900° C. and $NO_x$ content of the fumes reaches 4000 ppm (parts per million). According to the invention, there is injected via the injection tube 8, about 30% of the required oxygen (that is to say a 150 m³/h) in liquid phase, the remaining oxygen, 350 m³/h, being injected in conventional manner, in gaseous phase.

With an oxygen pressure in the injection tube 8 of $12 \times 10^5$ Pa, and a calibrated orifice 9 of 1.2 mm, the liquid oxygen jet formed has an outlet speed of 4 meters per second (m/s) (for a flow rate of 150 m³/h). This liquid oxygen jet passes through the primary flame zone and is not completely vaporized until about 2.5 m from the tip of the burner. The flow of 350 m³/h of oxygen injected in gaseous phase is sufficient to burn the 250 m³/h of natural gas. The remainder is burned by the liquid oxygen vaporized further downstream, the flame thereby acquiring a length of 4 meters. This combustion of staged type reduces the maximum temperature of the flame by about 220° C., which has two favorable results:

a) The $NO_x$ of the fumes is reduced to about 1000 ppm;

b) at the end of melting, the heat output is improved because all the carbon monoxide from the carbon of the cast iron charge (which forms during this period) is burned to carbon dioxide without oxidizing the iron (which normally takes place if it is attempted to superoxygenate the flame obtained according to conventional processes).

In this embodiment, the oxygen supplied to the tube 4 and to the tube 8 preferably comes from the same oxygen source under pressure, typically $12 \times 10^5$ Pa, delivered by an evaporator, the portion of the oxygen sent to the tube 8 passing through, at the outlet of the evaporator, a cooler 14 cooled by a cryogenic fluid 15, for example, nitrogen.

This embodiment, with injection of a portion (between 15 and 35%) of the total oxygen in liquid phase, that is with a ratio between the mass flow of liquid oxygen and gaseous oxygen comprised between 18 and 55%, is mostly feasible in furnaces for melting metal, enamel furnaces and glass furnaces.

Another embodiment relates to a fumes tube heater of 2 MW (or 3 T/h) of steam supplied with 200 m³/h of natural gas (based on methane $CH_4$) and 2000 m³/h of air. The natural gas at a pressure of $5\times10^5$ Pa is sent to the tube 5 and to the tube 8, the supply circuit of this latter passing through an exchanger 14 cooled by the liquid nitrogen to liquify the natural gas. The diameter of the calibrated orifice 9 is 0.7 mm. The liquid natural gas flow through this orifice is about 40 m³/h, namely 20% of the total flow, the 80% remaining, namely 160 m³/h, being injected in gaseous phase through the tube 5. The liquified natural gas leaves through the orifice 9 at a speed of 49 m/s.

The length of the first fume tube of the heater in which the flame deploys is about 5 meters. According to normal operating conditions, the flame occupies 3.5 m in this tube and its maximum temperature reaches 1620° C., which conduces to the formation of about 250 mg of $NO_x$ per m³ of fumes (about 200 ppm). According to the present invention, with an injection of 20% of the natural gas in liquid phase, the flame extends 5 meters along the primary fumes tube, its maximum temperature not being not higher than 1570° C. and the $N_x$ content of the fumes not more than 90 mg/m³. It is to be noted that the present European standards for injection from heaters will soon become 200 mg/m³ and are already 100 mg/m³ in the Netherlands. These performances can be achieved with water tube heaters of a power greater than 20 MW, but are still unreachable (at a reasonable cost) for lower power fume tube heaters.

This example of embodiment with injection in liquid phase of a portion (between 10 and 30%) of the natural gas supplied to the burner, namely a ratio between the mass flow rate of liquified natural gas and gaseous natural gas comprised between 10% and 45%, typically about 25% is suitable for most of the fume tube heaters of a power less than 20 MW.

As a modification, the burner can be supplied directly with liquified natural gas, in which case the cooler 14 is omitted and the tube 5 is replaced by an atomizer to pulverizing the liquified natural gas into fine droplets about the central jet of liquified gas 10.

Although the invention has been described in relation to particular embodiments, it is not thereby limited but on the contrary is susceptible to modifications and variations which will become apparent to one skilled in the art. In particular, the number of combustion jets for liquified gas can be multiplied and the geometric distribution of these jets relative to the injected combustion gas can be changed according to need.

What is claimed is:

1. In a combustion process comprising the steps of injecting, via a burner (1), at least one combustible gas flow and at least one flow of oxygenated combustion supporting gas; the improvement wherein the combustion supporting gas is oxygen which is injected in liquid and gaseous phases.

2. A process according to claim 1, wherein the ratio between the mass flows of the oxygen injected in liquid and gaseous phases is comprised between 10 and 45%.

3. A process according to claim 1, wherein the combustible gas is a gas containing methane.

4. A process according to claim 1, wherein the ratio between the mass flow rates of the flows of the oxygen injected in liquid phase and in gaseous phase is comprised between 18 and 35%.

5. A process according to claim 1, wherein at least one portion of the oxygen in liquid phase is injected centrally (10) at the end of the burner (1).

6. A process according to one of claim 1, wherein the burner (1) is part of a heater.

7. A process according to one of claim 1, wherein the burner (1) is part of a metal melting furnace.

8. A process according to one of claim 1, wherein the burner (1) is part of a glass furnace.

\* \* \* \* \*